(12) United States Patent
Butcher

(10) Patent No.: US 7,836,223 B2
(45) Date of Patent: Nov. 16, 2010

(54) OPERATION OF MEDIA INTERFACE TO PROVIDE BIDIRECTIONAL COMMUNICATIONS

(75) Inventor: Lawrence Llewelyn Butcher, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 218 days.

(21) Appl. No.: 12/147,248

(22) Filed: Jun. 26, 2008

(65) Prior Publication Data

US 2009/0013095 A1    Jan. 8, 2009

Related U.S. Application Data

(60) Provisional application No. 60/958,273, filed on Jul. 2, 2007.

(51) Int. Cl.
    *G06F 13/14*    (2006.01)
(52) U.S. Cl. ............................................ 710/31; 710/8
(58) Field of Classification Search ........................ None
     See application file for complete search history.

(56) References Cited

U.S. PATENT DOCUMENTS

| | | | |
|---|---|---|---|
| 5,604,450 A | | 2/1997 | Borkar et al. |
| 5,742,273 A | | 4/1998 | Flinders et al. |
| 5,819,051 A | | 10/1998 | Murray et al. |
| 5,974,464 A | | 10/1999 | Shin et al. |
| 7,269,673 B2 | * | 9/2007 | Kim et al. ...................... 710/72 |
| 7,321,946 B2 | * | 1/2008 | Olson ......................... 710/300 |
| 7,548,675 B2 | * | 6/2009 | Tatum et al. ................. 385/100 |
| 7,577,908 B2 | * | 8/2009 | Frazier et al. ................ 715/736 |
| 7,639,765 B2 | * | 12/2009 | Suzuki et al. ................ 375/354 |
| 7,649,949 B2 | * | 1/2010 | Williams et al. ............. 375/259 |
| 2007/0073936 A1 | * | 3/2007 | Cardenas et al. .............. 710/62 |

FOREIGN PATENT DOCUMENTS

| | | |
|---|---|---|
| WO | WO-00/16302 | 3/2000 |
| WO | WO-0195583 | 12/2001 |
| WO | WO-2006095313 | 9/2006 |

OTHER PUBLICATIONS

High-Definition Multimedia Interface Specification Version 1.3a, 2006, pp. 8-9.*
"8029P029PCT ISR WO Mailed Nov. 14, 2008 for PCT/US08/68937", (Nov. 14, 2008), Whole Document.
Eidson, Stevan , et al., "30.2: HDMI: High-Definition Multimedia Interface", *SID International Symposium*, Baltimore Maryland vol. XXXIV, May 20, 2003 , 1024-1027.
International Preliminary Report on Patentability mailed Jan. 14, 2010 for Int'l ApplicationNo. PCT/US2008/068937.

* cited by examiner

*Primary Examiner*—Cheng-Yuan Tseng
(74) *Attorney, Agent, or Firm*—Blakely Sokoloff Taylor & Zafman

(57) ABSTRACT

Embodiments of the invention are generally directed to operation of a media interface to provide bidirectional communications. An embodiment of a method includes connecting a first device to a second device via a media interface, the media interface including a communication channels for unidirectional data transmission, the media interface being in compliance with a media protocol. The method further provides for configuring the first device and the second device for bidirectional data transmission, the bidirectional data transmission being conducted according to a network protocol, and transmitting bidirectional data between the first device and the second device via the media interface.

19 Claims, 7 Drawing Sheets

OPERATION OF MEDIA INTERFACE TO PROVIDE BIDIRECTIONAL COMMUNICATIONS

RELATED APPLICATIONS

This application is related to and claims priority to U.S. provisional patent application 60/958,273, filed Jul. 2, 2007.

TECHNICAL FIELD

Embodiments of the invention generally relate to the field of networks and, more particularly, to a method and apparatus for operation of a media interface to provide bidirectional communications.

BACKGROUND

Electronic devices, such as multimedia devices, may be connected together in a network in order to share data, increase convenience, and make fuller use of each element. For example, certain devices within a home or other similar environment may be connected together. In such an environment, there may be multiple potential sources and users of streaming digital media content for audio, video, gaming, and other uses.

In providing such a network environment, there may be mixture of existing media devices and newer media devices. Such devices will vary in the types of interfaces and connections that available for data. For example, such devices may include interfaces designed for audio/visual data, including High-Definition Multimedia Interface (HDMI®) interfaces (a digital audio/video interface for transmission of data streams), as well as network connections such as Ethernet. HDMI provides for unidirectional transmission of media and related data from a transmitting device to a receiving device, while a network protocol such as Ethernet provides for bidirectional data transmission between devices.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Figure 1:
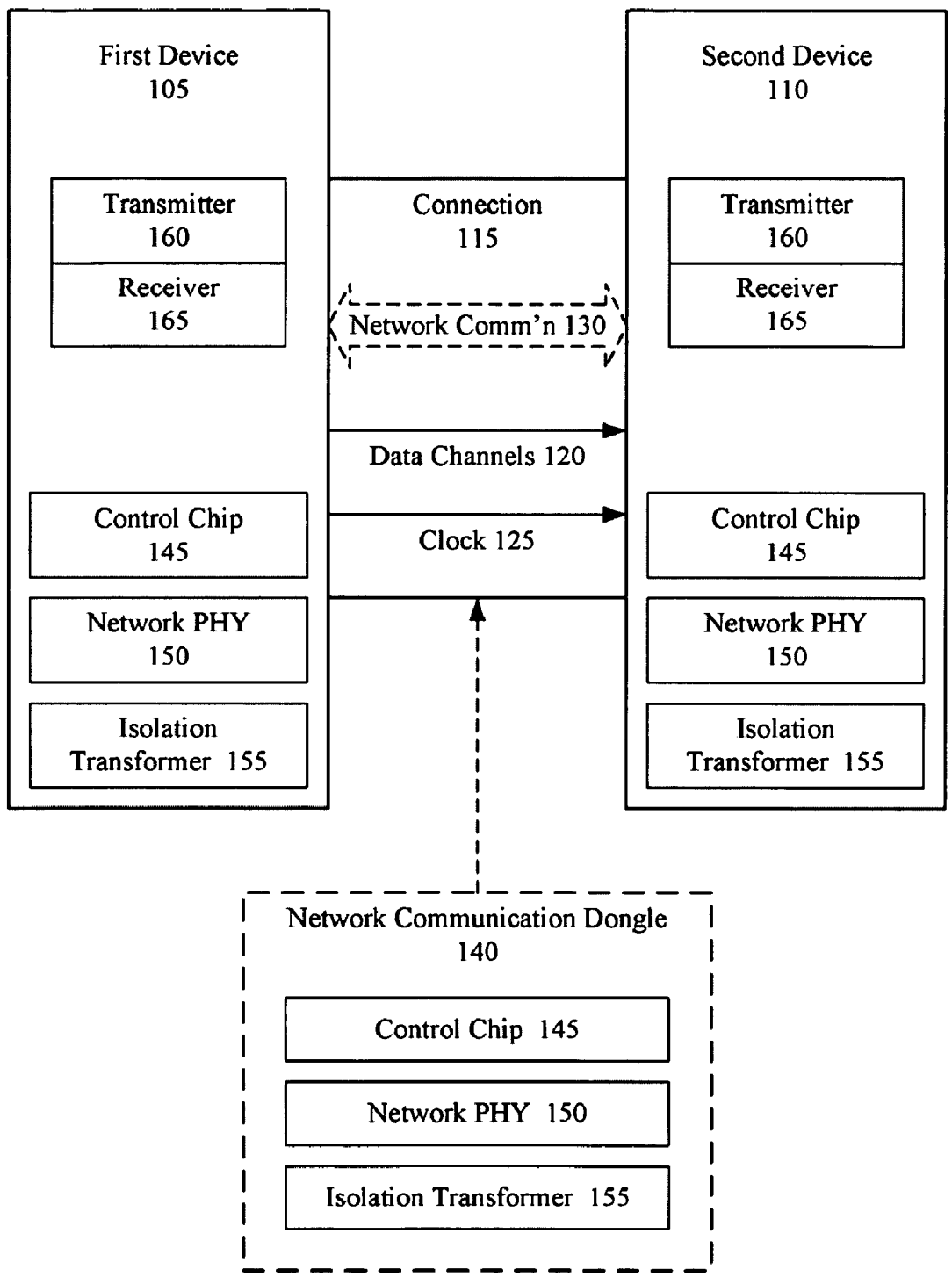
FIG. 1 is an illustration of an embodiment of a system to provide communications between devices.

Embodiments of the invention are generally directed to operation of a media interface to provide bidirectional communications.

In a first aspect of the invention, a method includes connecting a first device to a second device via a media interface. The media interface includes multiple communication channels for unidirectional data transmission, the media interface being in compliance with a media protocol. The method further provides for configuring the first device and the second device for bidirectional data transmission, the bidirectional data transmission being conducted according to a network protocol, and transmitting bidirectional data between the first device and the second device via the media interface.

In a second aspect of the invention, an apparatus includes a media interface connection for a media protocol, the media interface connection including multiple channels for unidirectional data transmission, wherein the channels of the media interface connection are to be configured for bidirectional data transmission according to a network protocol. The apparatus further includes a transmitter for transmission of data via the media interface connection, and a receiver for reception of data received via the media interface connection.

DETAILED DESCRIPTION

Embodiments of the invention are generally directed to operation of a media interface to provide bidirectional communications.

As used herein, "entertainment network" means an interconnection network to deliver digital media content (including music, audio/video, gaming, photos, and others) between devices. An entertainment network may include a personal entertainment network, such as a network in a household, an entertainment network in a business setting, or any other network of entertainment devices. In such a network, certain network devices may be the source of media content, such as a digital television tuner, cable set-top box, video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions. In some embodiments, the network devices may be co-located on a single local area network. In other embodiments, the network devices may span multiple network segments, such as through tunneling between local area networks. The entertainment network may include multiple data encoding and encryption processes.

In some embodiments, a network provides an interface between a media protocol for the transport of audio/visual data and related data and a network protocol. In some embodiments, a multimedia connection that would normally provide a unidirectional data transmission according to a unidirectional data protocol is utilized to enable a bidirectional data transmission according to a bidirectional data protocol, such as a bidirectional connection between network devices. In some embodiments, a device including a media connection, such as an HDMI compatible device, may operate together with network connections including, but not limited to, Ethernet. As used herein, "unidirectional" describes a device, connection, or channel to provide data communication in a single direction, such as from a transmitting device to a receiving device. However, a unidirectional connection may also include certain signals, such as control signals or discovery processes, that are transmitted from the receiving device to the transmitting device. As used herein, "bidirectional" describes a device, connection, or channel to provide data communication in two directions, such as both from a transmitting device to a receiving device and from the receiving device to the transmitting device.

A media interface may include multiple communications channels between a transmitting device and a receiving device, which channels are normally used to provide a unidirectional data communications. In some embodiments, the operation of the media interface to provide bidirectional communications includes the reversal of at least one communications channel of the multiple communications channels to provide communications from the receiving device to the transmitting device. In some embodiments, the communications channel is a channel that may be implemented for reversal without significantly damaging the original function, thus allowing the devices to operate in unidirectional mode in a normal fashion. In one example, a HDMI interface includes a clock channel, and in some embodiments the HDMI clock channel may be reversed in order to carry data traffic from the receiving device to the transmitting device.

Embodiments of the invention are not limited to any particular media or network protocol, but include the utilization of an HDMI connector and interface for the transmission of bidirectional Ethernet data. HDMI includes the High-Definition Multimedia Interface, Specification 1.3 (Jun. 22, 2006) and related specifications, and any prior or subsequent specifications. Ethernet includes the IEEE (Institute of Electrical and Electronics Engineers) 802.3 standards and related standards, and any prior or subsequent standards. In other embodiments, an interface is provided for any system in which data is may be exchanged bidirectionally, including transmission at high speeds. In some embodiments, a transmission protocol may include data having packet delimiters and including data headers to enable a receiver to interpret the data. In some additional examples, DisplayPort, as established by the Video Electronics Standards Association (VESA), or SCSI (Small Computer System Interface) data may be also be transmitted bidirectionally via a media interface in some embodiments.

In some embodiments, a first device communicates over an existing type of connection, the connection providing for unidirectional data transmission. The first device may operate either as a unidirectional device or as a bidirectional device, depending on the capabilities of the type of device with which the first device communicates. In an example, the first device may be communicating with a second device. The first and second devices may be two of the devices in a network. The second device may be a unidirectional device, such as legacy media device, or may be a bidirectional device, such as a new media device utilizing the protocol of the first device. If the second device supports a network protocol such as, for example, Ethernet, the devices may negotiate to both exchange data bidirectionally according to the Ethernet protocol via the unidirectional interface.

In some embodiments, an existing media connector may be used in the transport of media stream data in a network. In one example, an HDMI connector may be used to provide for an Ethernet connection. In some embodiments, the existing connectors for media devices may be shared for the Ethernet data transport.

In an example, a media connection, such as an HDMI connection, is a unidirectional connection, with a transmitter and a receiver being involved in a transmission. However, Ethernet and similar network protocols are bidirectional data protocols, with data being transmitted back and forth between devices. In some embodiments, the same cable and connectors that are used for the unidirectional connection may also used for the bidirectional network connection. In order to operate in bidirectional communications, the transmitter and receiver each operate as a transceiver, containing both a transmitter and a receiver.

However, the utilization of a cable for multiple types of connections may affect the data path. If high speed signals are utilized, then any change in the I/O path may potentially adversely affect signal integrity. Poor signal integrity may cause loss of data or improper insertion of data elements, and may result in the failure of a digital link. In some embodiments, the channels of a connection are operated to provide bidirectional communication while maintaining signal integrity. In some embodiments, a channel that is normally used in connection with unidirectional communications is reversed to provide bidirectional communications, with the channel being chosen to avoid signal integrity issues that would cause communications problems.

For example, an HDMI 1.3 connector includes four pairs of signal connections, three pairs being high speed data wires and one pair being a medium high speed clock wire running at a lower speed than the high speed data wires. However, the clock wire is less sensitive to disruptions than the data wires because the clock is slower and contains a relatively small amount of information in comparison with the high speed data wires, which generally transport high definition multimedia data and related data. For this reason, extra capacitance may be added to the clock channel in allowing for bidirectional communications without greatly affecting the clock function, as long as the clock remains periodic and maintains the same frequency. In some embodiments, rather than utilizing only a clock transmitter and a clock receiver, a clock transmitter is instead both a transmitter and a receiver and a clock receiver is instead both a transmitter and a receiver to allow for bidirectional communications that utilize the clock channel. In an embodiment, a modification in the clock channel is implemented to allow for transmission and reception of network data signals, with the clock channel being modified in order to avoid affecting the integrity of the high speed signals carried by the connector over the data lines.

In some embodiments, a device, chip, or circuit is utilized to connect either with an existing product unidirectionally, acting in the same manner as the existing product, or in with a new product in a bidirectional operation. In some embodiments, if a "new chip" (an embodiment of a chip allowing for bidirectional operation) connects to an old product, the new chip will operate in the same manner as an old chip for unidirectional communication. However, if a new chip connects to another new chip, the chips may operate in a bidirectional manner, including processes for discovering each other over another channel using an appropriate discovery protocol.

In some embodiments, a powered interface may contain a control chip to provide for data transmission, an embedded or external Ethernet PHY (physical layer), and any required isolation transformer. In some embodiments, power is also made available to the receiving end for the data transmission. In some embodiments, the control chip will convert serial Transmit and Receive data into a form that is useful for the embedded or external PHY that follows. The implementation of the control chip, PHY, and isolation transformer may vary in different embodiments. In certain embodiments, the elements are implemented in a device. In certain embodiments, one or more of such elements may be implemented in an external connector or unit (commonly referred to as a dongle) coupled with the interface that may be used to support the connection.

In some embodiments, the connections and operations for the transmitter and receiver sides of a communication may be as follows in Table 1, where:

TABLE 1

| Signal | Transmitter Side | Receiver Side |
|---|---|---|
| Pin 1 TMDS Data2+ | →Eth Xmit Data+ | ←Eth Rec Data+ |
| Pin 2 TMDS Data2 Shield | | |
| Pin 3 TMDS Data2− | →Eth Xmit Data− | ←Eth Rec Data+ |
| Pin 4 TMDS Data1+ | →Eth Xmit Clk+ | ←Eth Rec Clk+ |
| Pin 5 TMDS Data1 Shield | | |
| Pin 6 TMDS Data1− | →Eth Xmit Clk− | ←Eth Rec Clk+ |
| Pin 7 TMDS Data0+ | | |
| Pin 8 TMDS Data0 Shield | | |
| Pin 9 TMDS Data0− | | |
| Pin 10 TMDS Clock+ | ←Eth Rec Data+ | →Eth Xmit Data+ |
| Pin 11 TMDS Clock Shield | | |
| Pin 12 TMDS Clock− | ←Eth Rec Data− | →Eth Xmit Data− |
| Pin 13 CEC | | |
| Pin 14 Reserved (N.C. on device) | | |
| Pin 15 SCL | ↔ device ID/CTL | ↔ device ID/CTL |
| Pin 16 SDA | ↔ device ID/CTL | ↔ device ID/CTL |
| Pin 17 DDC/CEC Ground | →Tap Gnd | →Tap Gnd |
| Pin 18 +5 V Power | →Tap Power | →Tap Power |
| Pin 19 Hot Plug Detect | ↔ Xmit/Rec detect | ↔ Xmit/Rec detect |

→means a signal out of the media connector
←means a signal into the media connector
↔ means a two-way communication In this embodiment, the Data2 and Data1 pairs are each used in their natural directions (from transmitter to receiver), with Data2 providing the network transmit data (the data transmitted from the transmitter side to the receiver side) and Data1 providing a clock signal, if needed. The Data0 wires are unused. In some embodiments, the clock may not be needed, and thus the Data1 wires may also be unused. In some embodiments the Data0 or Data1 wires may be used for other data transmission purposes rather than being unused. The actual connections provided in Table 1 are only an example, and any of the data pairs may be utilized for data, clock, or other uses. In this implementation, the TMDS Clock wires provide bidirectional communication capability, and are utilized for the receiver data transmission (the data transmitted from the receiver side to the transmitter side). In some embodiments, the pair of TMDS clock wires may be run backwards in comparison with the normal direction of clock signal transmission.

The data transmission rates provided by a network connection, such as an Ethernet connection, may vary according to the implementation. In one example, the data rate carried by an interface may be up to 1.25 GBit/sec, and a system may negotiate to 1/10 of this data rate, or may pad the data stream to maintain the data rate as needed. In some embodiments, the data transmission rate for bidirectional communications may be relatively low in comparison to the normal unidirectional communications, which may include, for example, high speed transmission of high definition multimedia data.

In some embodiments, an interface will use 8 B/10 B encoding, in which each byte of data as an 8-bit symbol is mapped to a 10-bit symbol in order to provide DC-balance while allowing reasonable clock recovery. 8 B/10 B encoding is utilized in, for example, the XAUI (10 Gigabit Attachment Unit Interface) standard for connecting 10 Gigabit Ethernet ports to each other and to other electronic devices. (See IEEE 802.3ae 10 GbE specification.). In some embodiments, the XAUI signaling scheme may be utilized in a system. In some embodiments transmission may be at a reduced transmission rate, such as 1 G Baud instead of 2.5 GBaud, to allow for utilization of the modified media protocol interface.

In some embodiments, a control chip in an interface may convert from a 1.25 GBit/sec serial data rate into GMII (Giga-bit Media Independent Interface) signals or into RGMII (Reduced Gigabit Media Independent Interface) signals in order to connect to an inexpensive 1 GBit PHY. In some embodiments, the interface will also connect to a 100 MBit/sec PHY via, for example, an MII (Media Independent Interface) or RMII (Reduced Media Independent Interface), or RGMII for Ethernet transmission.

In some embodiments, a Hot Plug Detect signal or other similar scheme will be used to configure the activity of a control chip (or controller) for an interface. If connected to a transmitter, the computer chip may operate as an I2C slave and advertise its existence. If connected to a Receiver, the computer chip may operate as an I2C master and announce its existence. The signal will only drive the clock wires after establishing cooperation with the HDMI chip it is connected to.

In some embodiments, a clock from the HDMI transmitter may be optionally provided to the HDMI receiver, with the availability of this clock potentially simplifying the design of the receiver. However, the transmission of the clock signal is not required in all embodiments. In some embodiments, the process of sending and receiving data across a reversed HDMI clock pin operates without the transmission of the clock from the HDMI transmitter.

FIG. 1 is an illustration of an embodiment of a system to provide communications between devices. In this illustration, a first device 105 is coupled with a second device 110 via a connection 115. In some embodiments, the first device 105 is a transmitting device and the second device 110 is a receiving device. In some embodiments, the connection 115 is via a media connection, such as an HDMI connector, and such connection is normally a unidirectional data transmission from the first device as transmitting device to the second device. In some embodiments, the connection 115 includes one or more data channels 120, which may be high speed data channels for high definition multimedia content, and a clock channel 125, which may be a relatively slower channel for transmission of limited data.

In some embodiment the first device 105 and the second device 110 utilize the connection 115 to transmit network data between the devices. In an embodiment, the connection transmits network communication data 130, such as Ethernet data, bi-directionally between the first device 105 and the second device 110 using the connection 115. In some embodiments, the devices utilize one or more of the data lines 120 and the clock line 125 to transmit data between the devices. In some embodiments, a channel may be reversed from its normal direction to allow for bidirectional communications. In some embodiments, the clock line 125 may be utilized for the reverse channel for bidirectional communications.

In some embodiments, the first device and the second device, if enabled for bidirectional communications, may include a control chip 145 (also referred to as a controller), network PHY 150 (such as an Ethernet PHY), and isolation transformer or similar isolation elements to support the transmission of bidirectional network data. In some embodiments, a device may not include such elements internally, but may utilize an external dongle 140 that includes one or more of such elements to support network transmission. As the devices are engaged in bidirectional transmission, both the first device 105 and the second device 110 act as transceivers, and thus include both a transmitter 160 and receiver 165.

Figure 2:
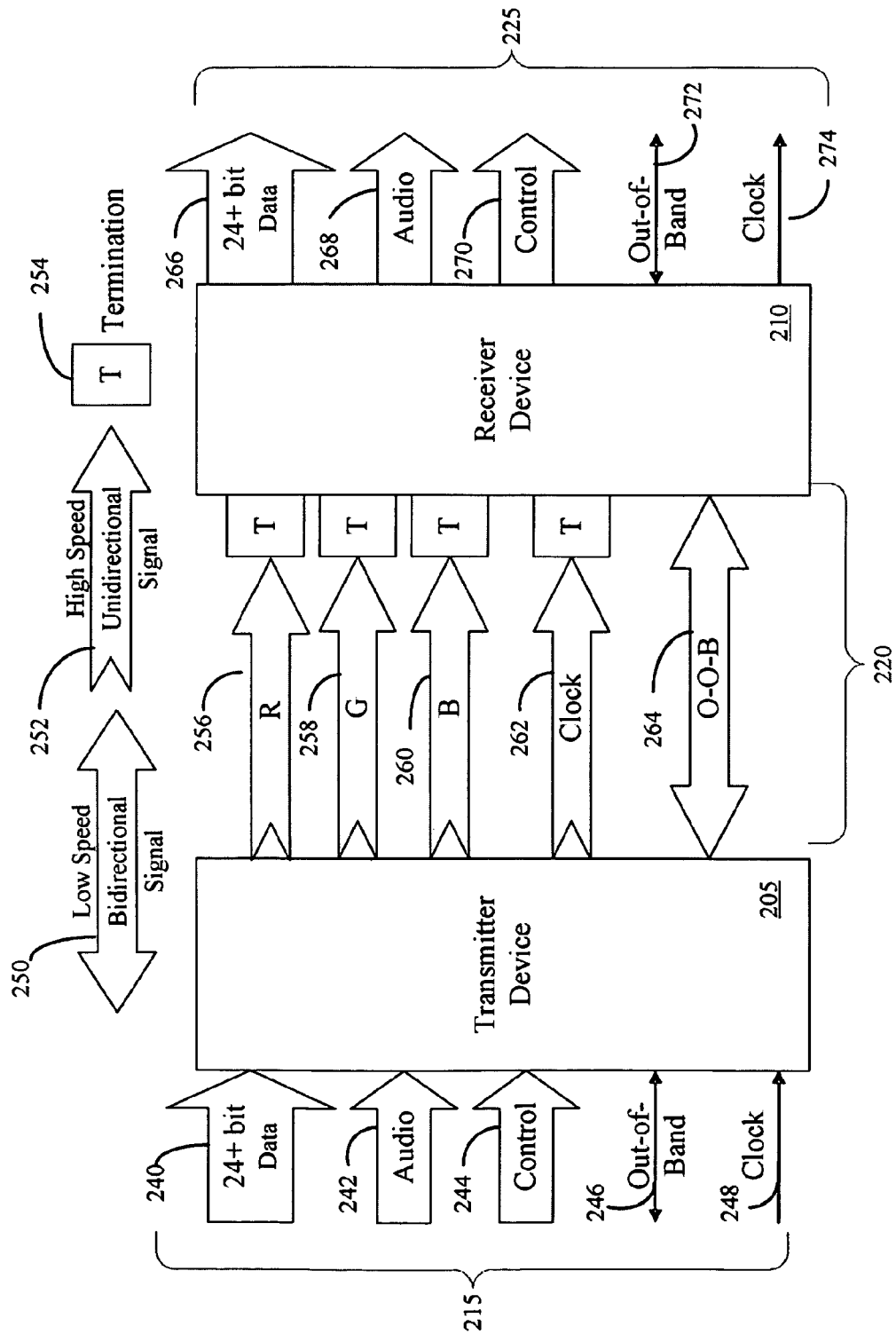
FIG. 2 is an illustration of an interface for an HDMI connection utilized in an embodiment of the invention.

FIG. 2 is an illustration of an interface for an HDMI connection utilized in an embodiment of the invention. An HDMI connection normally provides for unidirectional data communications. In this illustration, a transmitter device 205 receives parallel data 215 for a unidirectional transmission 220 to a receiver device 210, which will then convert such data into parallel data 225. The parallel input and output data may include video data 240 and 266, audio data 242 and 268, control data 244 and 270, out of band signal channel 246 and 272 (which may include multiple channels to carry various kinds of signals between the devices), and a clock signal 248 and 274. The data may be transmitted via, for example, a first data channel (denoted Red) 256, a second data channel (Green) 258, and a third data channel (Blue) 260, with audio, video, and auxiliary data packets being carried over such data channels. In addition, there is a clock channel 262 and an out of band signal channel. As indicated, the channels may be high speed unidirectional signals 252 ending at a termination points 254 for the data and clock channels, or may be a low bidirectional signals 250 for the out of band channel.

In some embodiments, the HDMI connection 220 between the transmitter device 205 and receiver device 210 is utilized to enable the transmission of network data, such as Ethernet data, between the devices. In some embodiments the communication channels are modified to support Ethernet transmission, while not significantly interfering with normal multimedia data transmission.

Figure 3:
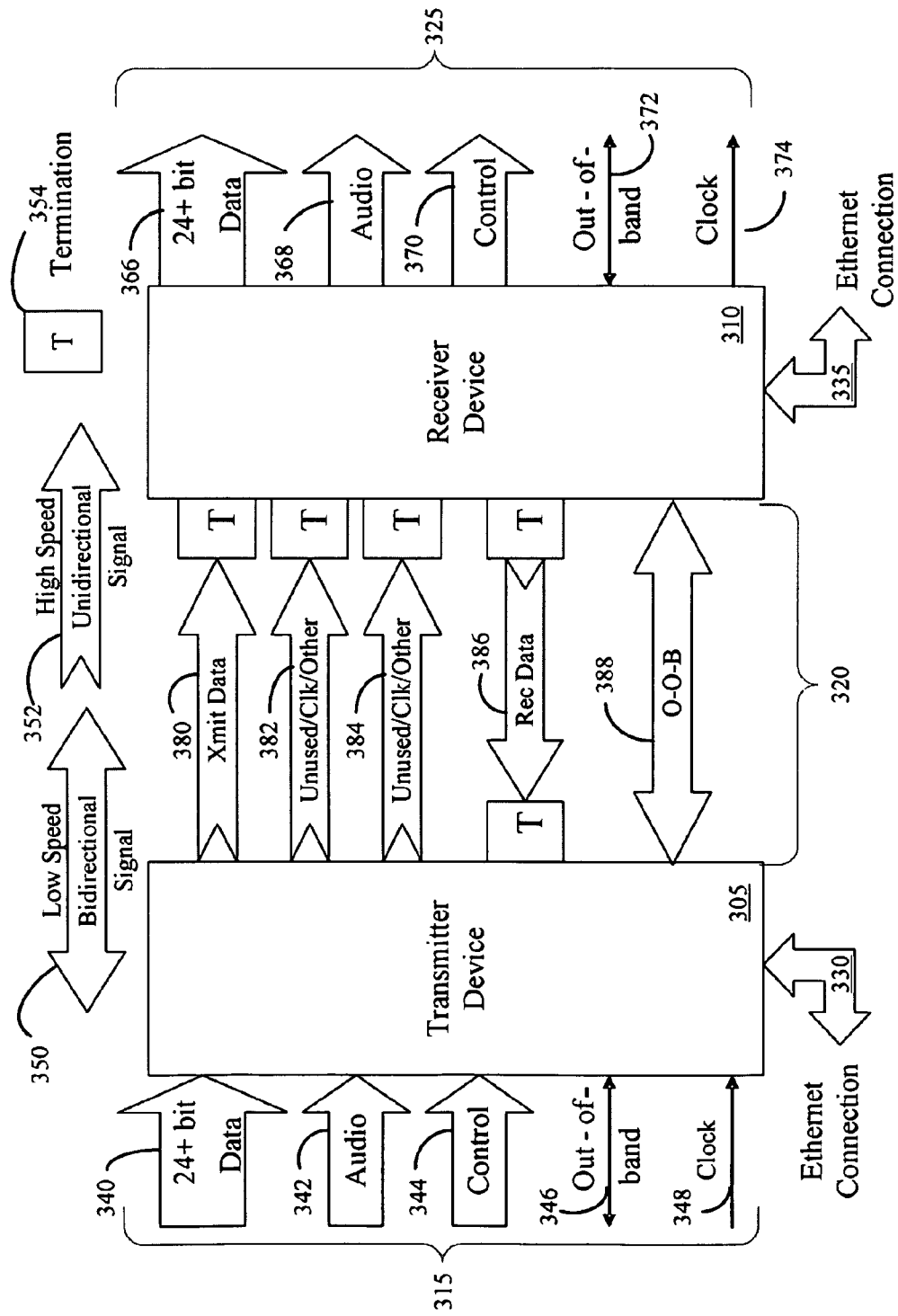
FIG. 3 is an illustration of an interface for a network protocol and media protocol connection.

FIG. 3 is an illustration of an interface for a network protocol and media protocol connection. In some embodiments, an interface that normally provides unidirectional data communications is utilized to provide bidirectional communications. In this illustration, the transmitter device 305 receives parallel data 315 for transmission 320 to a receiver device 310, which converts the received data to parallel data 325. The parallel input and output data again may include video data 340 and 366, audio data 342 and 368, control data 344 and 370, out of band signals 346 and 372, and a clock signal 348 and 374.

The connection between the transmitter device 305 and the receiver device may normally be a unidirectional transmission, such as an HDMI transmission from a transmitting device to a receiving device. However, in some embodiments, if the transmitter device 305 and receiver device 310 are enabled to operate bidirectionally and negotiate to provide bidirectional communications, the data channels operate in a manner to enable the transmission of bidirectional network data 320 between the devices. In some embodiments, a first data channel 380 (which may be any of the data channels of the interface) may be used to transmit data, while a second data channel 382 and a third data channel 384 are either unused, carry a clock signal, or are used for other transmitter data. In one example, the second data channel 382 may carry the clock signal, while the third data channel 384 is unused. In some embodiments the use of the data channels may be established by negotiations between the transmitter device 305 and the receiver device 310, with, for example, a default condition providing that a first data channel is used for transmitting data, a second data channel is used for transmitting a clock signal, and a third channel is unused.

In some embodiments, a channel of the interface, such, for example, as a clock channel, becomes a receive data channel 386, thereby allowing for the bi-directional communication between the devices. In some embodiments, the receiver data channel 386 transmits data in an opposite direction to the normal clock channel transmission. The out of band signal channel 388 is also illustrated, which in some embodiments may be utilized for discovery and configuration of the network devices. For example, the out of band channel 388 may be used to discover whether both devices are enabled for bidirectional operation and to negotiate for such operation. As indicated, the channels may be high speed unidirectional signals 352 ending at a termination point 354 for the data channels, or low speed bidirectional signals 350 for the out of band channel. The use of, for example, the transmit data channel 380 and the receive data channel 386 may utilized to produce bidirectional communications. In some embodiments, the first device 305 and second device support Ethernet connections 330 and 335, but embodiments of the invention are not limited to any particular data transmission. In some embodiments, the transmitter device 305 and receiver device 310 both operate as transceivers in exchanging bidirectional network data, including, but not limited to, Ethernet data, using the HDMI interface 320.

Figure 4:
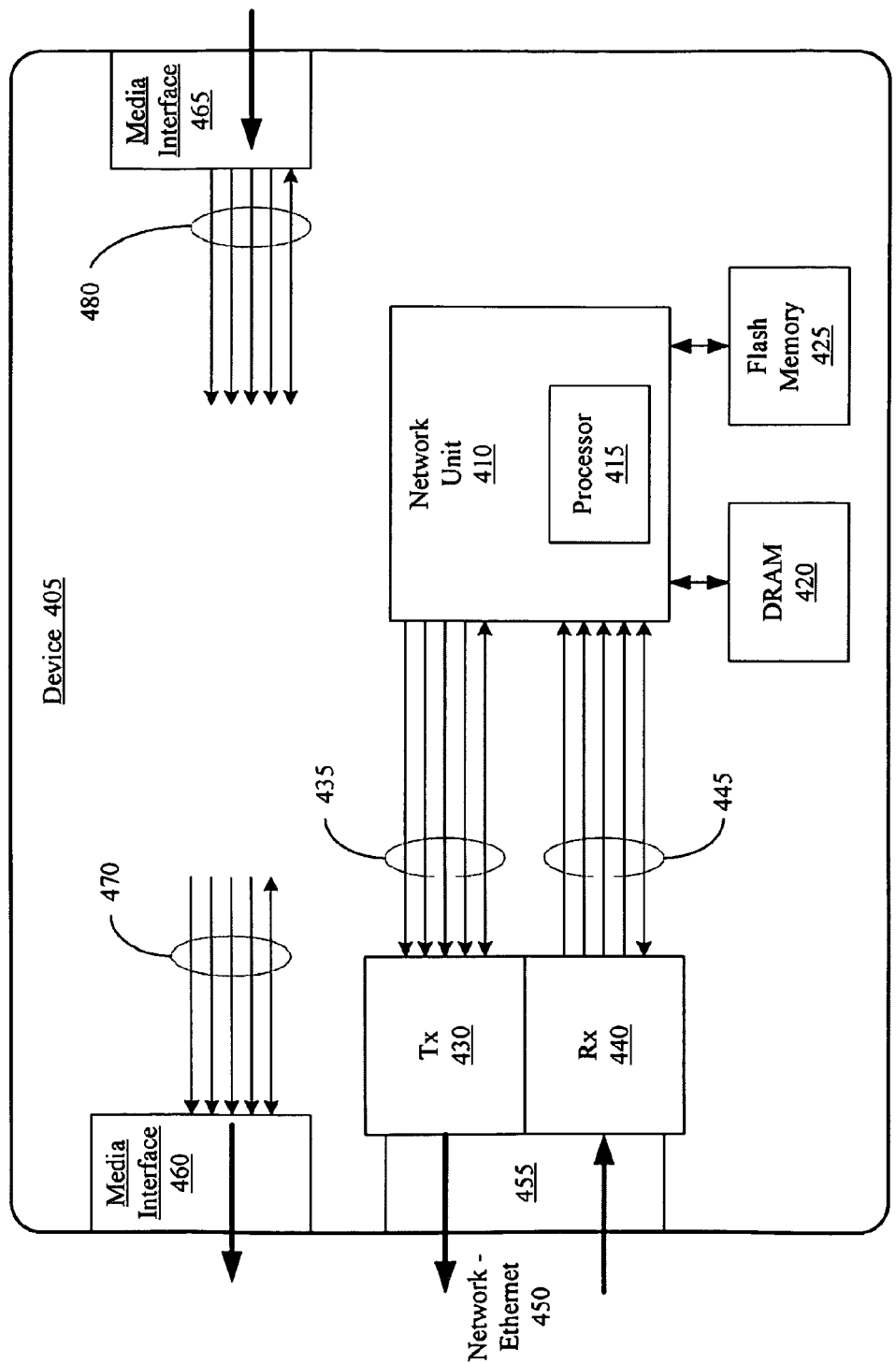
FIG. 4 is an illustration of embodiments of a device containing one or more media interface connections.

FIG. 4 is an illustration of embodiments of a device containing one or more media interface connections. In this illustration, a device 405 may be any device to connect with one or more other devices, including, but not limited to, devices in a network such as an entertainment network, including, but not limited to, devices illustrated in FIG. 5. For example, a device may be a television, a set top box, a storage unit, a game console, or other media device. In some embodiments, a device may include one or more media interface connections. In addition, the device may include one or more other connections, such as an Ethernet or other network connection.

In some embodiments, the device 405 may include a first media interface 460 including multiple data channels 470. For example, the first media interface may utilize an HDMI compatible connector that normally provides a unidirectional connection between a transmitting device and a receiving device for media data. In some embodiments the first media interface 460 is utilized in a manner to enable the optional transmission of bidirectional data between devices. In some embodiments, a device 405 may also include a second media interface 465 including multiple data channels 480, which may utilize a second HDMI or other media connector. In some embodiments the second media interface may also be utilized in a manner to enable the optional transmission of bidirectional data between devices.

In some embodiments, the device 405 may include one or more other connections, such as an Ethernet or other network connection 455. In some embodiments, the device 405 includes a network unit 410 to provide network functions. In some embodiments, the network unit 410 includes a processor for the processing of data. The device 405 may also include memory to support network operations, such as DRAM (dynamic random access memory) 420 or other similar memory and flash memory 425 or other nonvolatile memory. The device 405 may also include a transmitter 430 and/or a receiver 440 connected via data transmission lines 435 and data reception lines 445 to provide for transmission of data on the network or the reception of data from the network, respectively, via the network connection 455. In one example, the network connection 455 connects to a network such as an Ethernet network 450.

In some embodiments, the device 405 may utilize the first media interface 460 and the second media interface 465 to act as a length extender or network bridge, depending on the capabilities of other devices. In some embodiments the first media interface 460 may act as a source while the second media interface 465 acts as a destination. In an example, the first media interface 460 may negotiate with another device, such as a display (not illustrated in FIG. 4), that is connected to the first media interface 460, and if the display is network capable then the device 405 could advertise on its destination port (second media interface 465) that the device 405 is network capable, and thus provide a network bridge. If the display attached to the first media interface 460 is not network capable, then the device 405 may the act as a unidirectional-only device, thus, for example, acting in a manner of a length extender for media devices.

In some embodiments the first or second media interface connections may operate with the network connection 455 to send bidirectional data to a device that is connected via the media interface connection. For example, if a display is connected to the first media connection 460 and it is determined that the connected display is network capable, then the device 405 may be utilized to provide bidirectional data between the network 450 and the display that is attached to the first media interface connection 460.

Additional connections to the device 405 may also be present. The device 405 also may include numerous components for operation of the device, which are not illustrated here.

Figure 5:
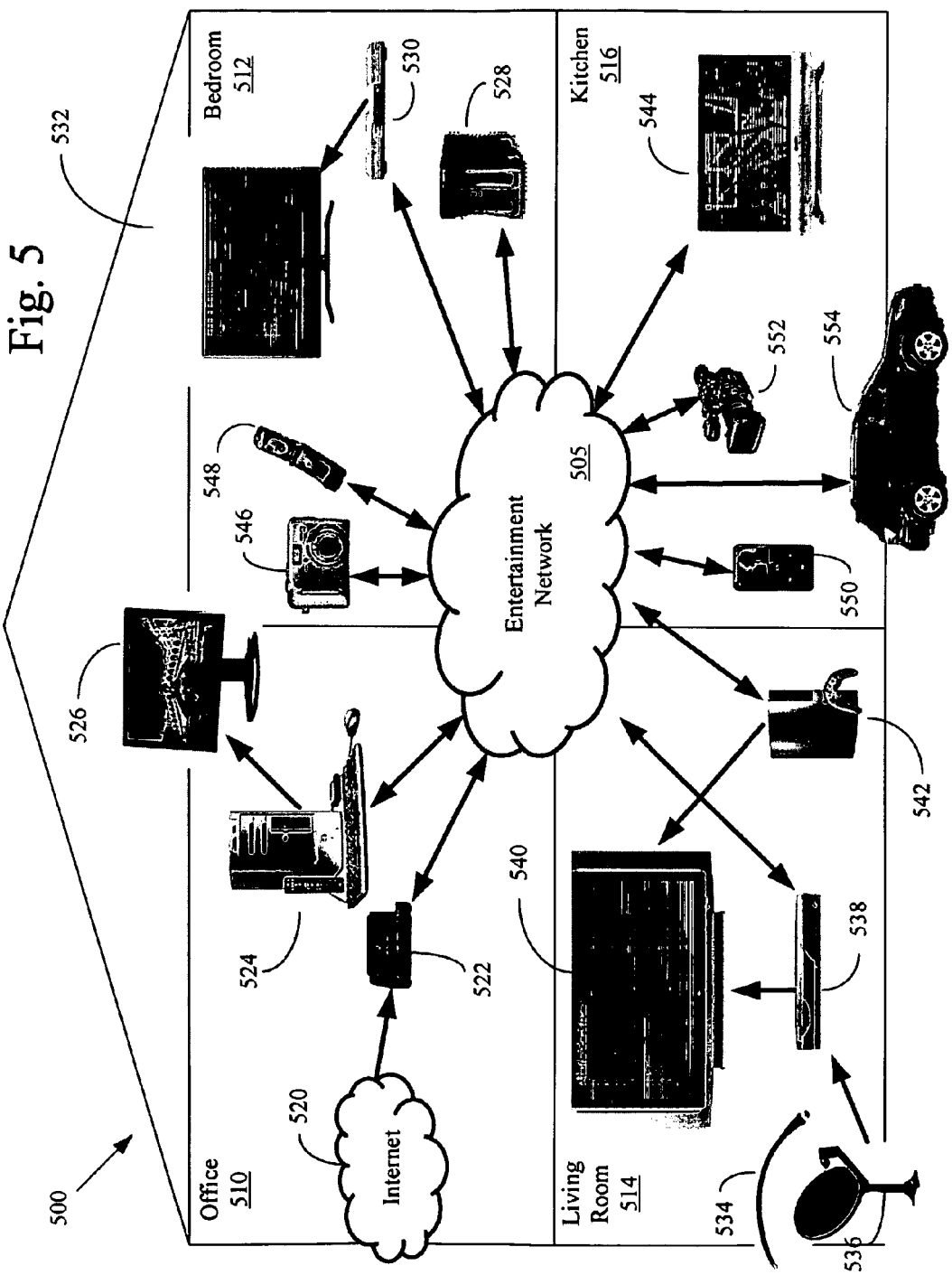
FIG. 5 is an illustration of embodiments of an entertainment network.

FIG. 5 is an illustration of embodiments of an entertainment network. In this illustration, the entertainment network system 500 provides for the connection of any compatible media device to the network. The connection is shown as a connection to entertainment network 505. In some embodiments, the devices operate as network without a central network server. Through the entertainment network, media data streams may be transferred between any of the connected devices. In addition, devices may be controlled remotely through the network. The devices may be connected to the network via any known connector and connection protocol, including coaxial cables, Ethernet cables, and Firewire, and wireless connections via Wi-Fi, Bluetooth®, and other wireless technologies. In some embodiments, the device may communicate via Ethernet or other network connection transmission through use of the HDMI cables and connectors between devices. In some embodiments, the normally unidirectional HDMI cables and connectors are utilized to provide bidirectional network operations between devices connected in the network.

In some embodiments, the devices may include any media sources or recipients. In FIG. 5, an office 510 may provide an Internet connection 520 via a gateway 522 to the network 505. The data received from the Internet may include any streaming media sources, including, but not limited to, purchased audio files (such as downloaded music files), video files (such as movies, television, and other), and computer games. The office 510 may also be connected to a personal computer 524 that utilizes a monitor 526, which may, among other functions, display certain media streams or operate certain computer games.

The entertainment network may also be connected with devices in a bedroom 512, which may, for example, contain a set top box 530 to provide data to a television 532. In addition, the bedroom (or any other space) may contain a media storage unit 528. The media storage unit 528 may receive data from any source connected to the network 505, and may provide to any data recipient connected to the network 505. The media storage unit 528 may contain any type of media stream data for the network.

The system may further include a living room 514 receiving, for example, input from a cable or fiber system 534 or from a satellite dish network 536. The media input from such sources may be provided to a set top box 538 connected to the network 505 and to a second television 540. Also connected to the network 505 for display on the living room television 540 may be a video game unit 542. There may be any number of other rooms with networked devices, such as a kitchen containing a third television 544 connected to the network 505. Other network devices may also be present, including, but not limited to, a stereo audio system that may include speakers placed throughout the house.

In addition, any number of mobile personal electronic devices may connect to the network. The devices may connect via a cable or via a wireless signal, including, but not limited to, Bluetooth, Wi-Fi, infrared or other similar wireless communication protocol. Each such protocol may require an interface to the network (which are not shown in FIG. 5), such as a Wi-Fi base station. Such mobile personal electronic devices could include a digital camera 546, a cellular telephone 548, a personal music device 550, or a video camera 552. In addition, a mobile system contained in an automobile 554 may connect to the network 505 when the automobile is in close proximity to the network (such as when present in a garage of the house). The mobile personal electronic devices may, for example, automatically connect to the network when within range of the network. While connected, the devices may be available to obtain data through the network or to provide data to the network, including possible automatic updates or downloads to the devices. In one example, a user may be able to access the data contained in any of the mobile electronic devices through the network, such as accessing the photographs stored on the digital camera 546 on the living room television 540 via the set top box 538.

Because the devices connected to the network vary in function, the data transferred through the network will include many different data protocols, including any known video and audio protocols. In one example, the media storage unit 528 may be required to obtain, store, and provide data of multiple different media protocols.

Figure 6:
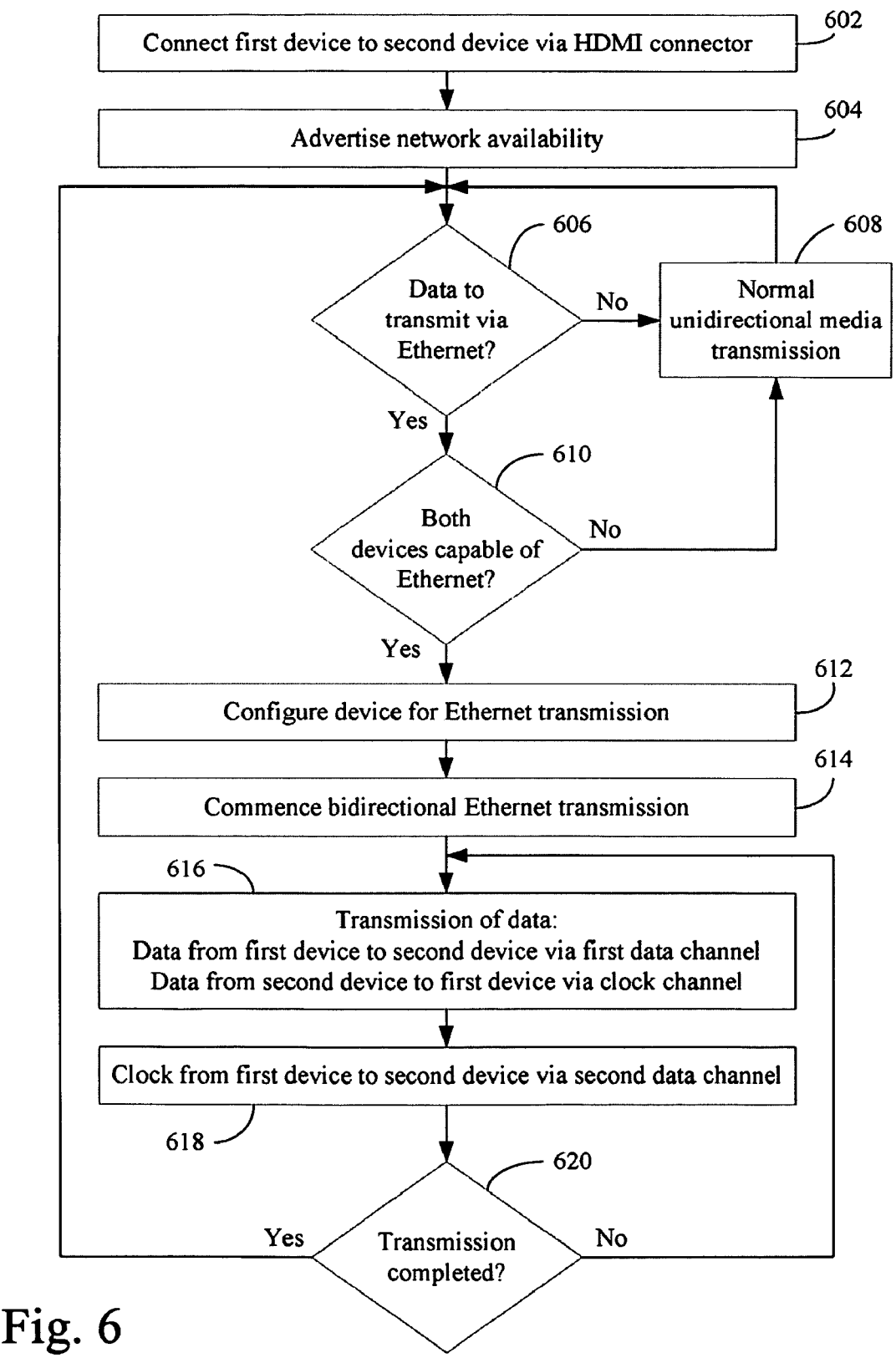
FIG. 6 is a flowchart to illustrate an embodiment of a process for transferring data between devices.

FIG. 6 is a flowchart to illustrate of an embodiment of a process for transferring data between devices. In the illustrated process, a first device is connected to a second device via a media connector, such as an HDMI connector 602. In some embodiments the operations via the media connector would normally be unidirectional, such as from the first device (the transmitting device) to the second device (the receiving device). If the devices have a network capability, such as, for example, Ethernet capability, the devices may advertise or announce their availability according to the network standard 604. The advertisement or announcement of availability may be transmitted via, for example, an out of band signal channel or other available channel, such as out-of-band signal channel 388 illustrated in FIG. 3. If there is data to be transmitted via Ethernet 606 and both devices are capable of Ethernet transmission via the HDMI connector 610, the devices may be configured for Ethernet transmission 612. Otherwise the devices may conduct normal unidirectional media transmission, such as the normal transmission of HDMI data 608.

Subsequent to any configuration for Ethernet, the devices will commence bidirectional Ethernet transmission. In some embodiments the transmission of data includes the transmission of data from a first device to a second device via a first channel and the transmission of data from the second device to the first device via a second channel. In a specific embodiment, the transmission of data includes the transmission of data from the first device to the second device via a first data channel of the three HDMI data channels, and the transmission of data from the second device to the first device via the HDMI clock channel, with the clock channel thus being used in reverse of its usual operation 616. In a specific embodiment, a clock signal from the first device to the second device, if needed, may be transmitted from the first device to the second device via a second HDMI data channel 618. When transmission of the Ethernet data is completed 620, the device may return to either normal HDMI transmission 608 or any additional Ethernet transmissions.

Figure 7:
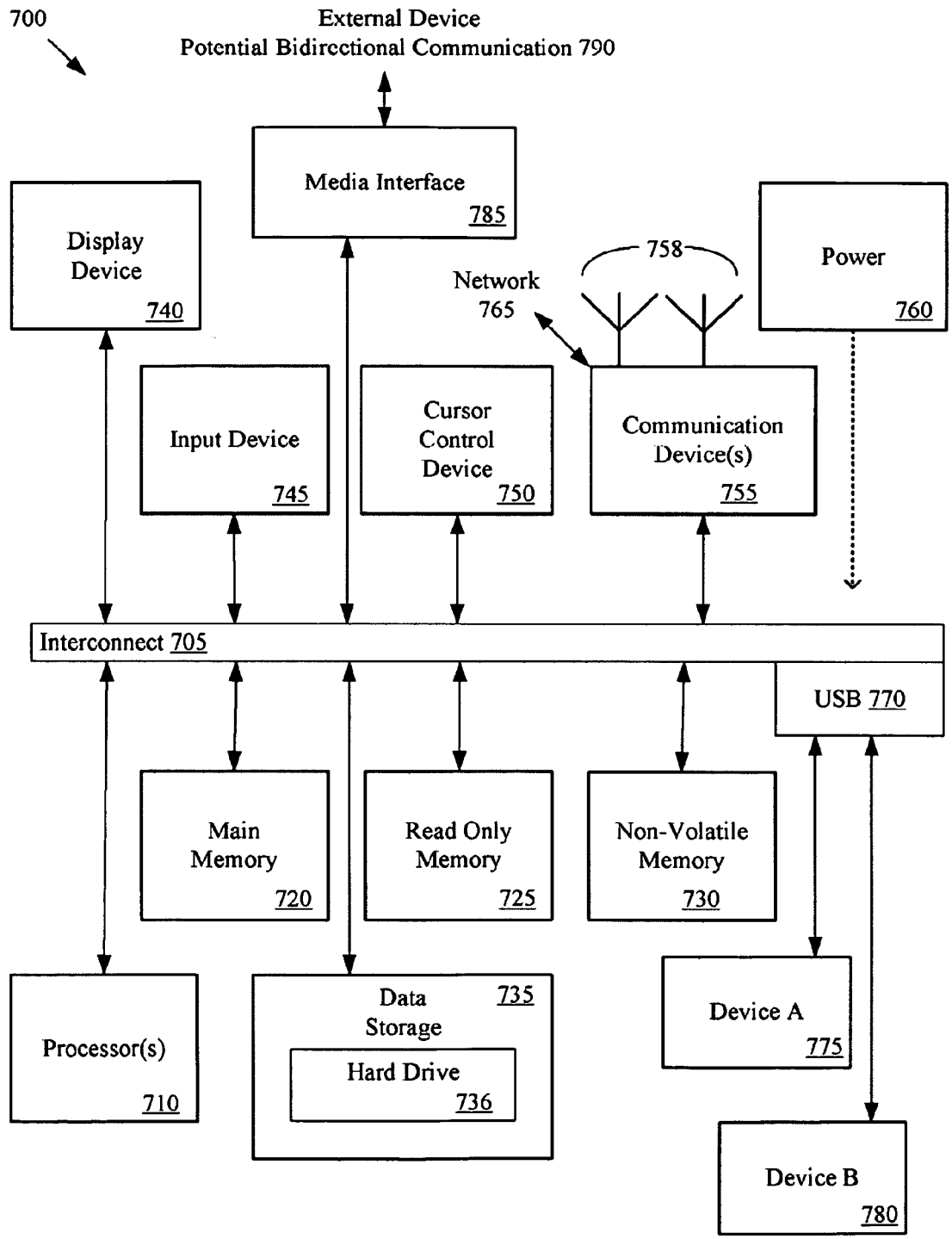
FIG. 7 is an illustration of an embodiment of a device included in an embodiment of the invention.

FIG. 7 is an illustration of an embodiment of a device included in an embodiment of the invention. In this illustration, certain standard and well-known components that are not germane to the present description are not shown. Under some embodiments, a device 700 may be either a transmitting device or a receiving device. In some embodiments, the device 700 may include a media interface 785, which may include an HDMI connector or other media connector. In some embodiments, the media interface 785 may normally provide unidirectional data communication but that such interface is implemented in a manner to enable potential bidirectional communications with a connected device, such as with external device 790, if the connected device is enabled for bidirectional communications.

Under some embodiments, the device 700 comprises an interconnect or crossbar 705 or other communication means for communicating information, which may include high speed data transport. The device 700 further includes a processing means such as one or more processors 710 coupled with the interconnect 705 for processing information. The processors 710 may comprise one or more physical processors and one or more logical processors. Further, each of the processors 710 may include multiple processor cores. The interconnect 705 is illustrated as a single interconnect for simplicity, but may represent multiple different interconnects or buses and the component connections to such interconnects may vary. The interconnect 705 shown in FIG. 7 is an abstraction that represents any one or more separate physical buses, point-to-point connections, or both connected by appropriate bridges, adapters, or controllers. The interconnect 705 may include, for example, a system bus, a PCI or PCIe bus, a HyperTransport or industry standard architecture (ISA) bus, a small computer system interface (SCSI) bus, a IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) The device 700 further may include a serial bus, such as USB bus 770, to which may be attached one or more USB compatible devices, such as device A 775 and device B 780.

In some embodiments, the processors 710 may be utilized to support one or more virtual machines. In some embodiments, the device 700 further comprises a random access memory (RAM) or other dynamic storage device as a main memory 720 for storing information and instructions to be executed by the processors 710. Main memory 720 also may be used for storing temporary variables or other intermediate information during execution of instructions by the processors 710. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include a shared memory, such as a shared BIOS/OS memory, that is accessible by multiple agents in the device. The device 700 also may comprise a read only memory (ROM) 725 or other static storage device for storing static information and instructions for the processors 710. The device 700 may include one or more non-volatile memory devices 730 for the storage of certain elements, including, but not limited to, system BIOS and one or more pre-OS applications.

Data storage 735 may also be coupled to the interconnect 705 of the device 700 for storing information and instructions. The data storage 735 may include a magnetic disk, an optical disc and its corresponding drive, or other memory device. Such elements may be combined together or may be separate components, and utilize parts of other elements of the device 700. In a particular embodiment, the data storage 735 may include a hard drive 736.

The device 700 may also be coupled via the bus 705 to a display 740, such as a cathode ray tube (CRT) display, a liquid crystal display (LCD), a plasma display, or any other display technology, for displaying information to an end user. In some embodiments, the display 740 may be utilized to display television programming. In some environments, the display 740 may include a touch-screen that is also utilized as at least a part of an input device. In some environments, the display 740 may be or may include an audio device, such as a speaker for providing audio information, including the audio portion of a television program. An input device 745 may be coupled to the interconnect 705 for communicating information and/or command selections to the processors 710. In various implementations, the input device 745 may be a keyboard, a keypad, a touch-screen and stylus, a voice-activated system, or other input device, or combinations of such devices. Another type of user input device that may be included is a cursor control device 750, such as a mouse, a trackball, or cursor direction keys for communicating direction information and command selections to the one or more processors 710 and for controlling cursor movement on the display 740.

One or more communication elements 755 may also be coupled to the interconnect 705. Depending upon the particular implementation, the communication elements 755 may include a transceiver, a wireless modem, a network interface card, LAN (Local Area Network) on motherboard, or other interface device. The communication elements 755 may provide a connection to a network 765 to transmit network data, such as Ethernet data. The uses of a communication device 755 may include reception of signals from wireless devices. For radio communications, the communication device 755 may include one or more antennas 758, including any dipole or monopole antennas, as required. In one embodiment, the communication elements 755 may include a firewall to protect the device 700 from improper access. The device 700 may also comprise a power device or system 760, which may comprise a power supply, a battery, a solar cell, a fuel cell, or other system or device for providing or generating power. The power provided by the power device or system 760 may be distributed as required to elements of the device 700.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described. The illustrated elements or components may also be arranged in different arrangements or orders, including the reordering of any fields or the modification of field sizes.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon computer program instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

What is claimed is:

1. A method comprising:
connecting a first device to a second device via a media interface, the media interface including a plurality of communication channels for a unidirectional data transmission mode from the first device to the second device, the media interface being in compliance with a media protocol including High Definition Multimedia Interface (HDMI), the first device being a transmitting device and the second device being a receiving device for the media protocol, the plurality of communication channels including a first channel for data transmission and a second channel for transmission of a clock signal in the unidirectional data transmission mode;

discovering by the first device that the second device is available for a bidirectional data transmission mode using the plurality of communication channels;

in response to discovery that the second device is available for the bidirectional data transmission mode, configuring the first device and the second device for bidirectional data transmission using the plurality of data channels, the bidirectional data transmission being conducted according to a network protocol including Ethernet; and transmitting bidirectional data between the first device and the second device via the media interface, wherein transmitting bidirectional data includes transmitting data from the first device to the second device via the first channel and transmitting data from the second device to the first device via the first channel and transmitting data from the second device to the first device via the second channel, the second channel being operated in a reverse direction for data transmission in the bidirectional data transmission than a direction for the second channel in transmitting the clock signal in the unidirectional data transmission;

wherein the media interface connection further includes an out of band channel, and wherein the first device discovering that the second device is available for the bidirectional data transmission mode includes the first device and second device using the output of band channel to negotiate for bidirectional data transmission.

2. An apparatus comprising:
a media interface connection for connecting with a receiving device to transmit data using a media protocol including High Definition Multimedia Interface (HDMI), the media interface connecting including a plurality of channels for a unidirectional data transmission from the apparatus to the receiving device, the plurality of channels including a first channel for data transmission and a second channel for transmission of a clock signal in the unidirectional data transmission mode;

a transmitter for transmission of data via the media interface connection; and a receiver for reception of data received via the media interface connection;

wherein the apparatus reconfigures the channels of the media interface connection for a bidirectional data transmission mode according to a network protocol including Ethernet; and upon the apparatus discovering that the receiving device is available for bidirectional data transmission, the apparatus is to reconfigure the channels of the media interface connection for the bidirectional data transmission, the first channel being configured for transmitting data to the receiving device and the second channel being configured for receiving data from the receiving device, the second channel being operated in a direction for the bidirectional data transmission mode that is reversed from a direction of the second channel for the transmission of a clock signal in the unidirectional data transmission mode;

wherein the media interface connection further includes an out of band channel, and wherein the transmitter device discovering that the receiver device is available for the bidirectional data transmission mode includes the transmitter device and receiver device using the output of band channel to negotiate for bidirectional data transmission.

3. A system comprising:

a first device, the first device having a media interface connection to transmit data, the media interface connection being compatible with a media protocol including High Definition Multimedia Interface (HDMI) that provides unidirectional data transmission, the media interface connection including a plurality of channels for unidirectional data transmission, the plurality of channels including a first channel for data transmission and a second channel for transmission of a clock signal in the unidirectional data transmission mode; and a second device, the device having a media interface connection to connect with the first device;

wherein the first device and the second device are to negotiate for a bidirectional data transmission mode according to a bidirectional data protocol and to configure the plurality of data channels for bidirectional data transmission;

wherein: the first device reconfigures the channels of the media interface connection for a bidirectional data transmission according mode to a network protocol including Ethernet; and upon the first device and second device negotiating for bidirectional data transmission, the first device and second device are to reconfigure the channels of the media interface connection for the bidirectional data transmission, a first channel of the plurality of channels being configured for transmission of data from the first device to the second device and a second channel of the plurality of channels being configured for transmission of data from the second device to the first device, the second channel being operated in a direction for the bidirectional data transmission mode that is reversed from a direction of the second channel for transmission of clock signals in the unidirectional data transmission mode;

wherein the media interface connection further includes an out of band channel, and wherein the first device discovering that the second device is available for the bidirectional data transmission mode includes the first device and second device using the output of band channel to negotiate for bidirectional data transmission.

4. The method of claim 1, wherein the plurality of communication channels includes a plurality of data channels, and wherein the first channel is a first data channel of the plurality of data channels.

5. The method of claim 1, wherein the second channel is a channel that may be used in bidirectional data communication without damaging operation of the second channel for unidirectional data communication.

6. The method of claim 1, wherein transmitting bidirectional data further includes transmitting a clock signal from the first device to the second device using a third channel, the third channel being a second data channel of the plurality of data channels.

7. The method of claim 1, further comprising connecting the first device to a third device via a second media interface.

8. The apparatus of claim 2, wherein the second channel is a channel that runs at a lower speed than the first channel.

9. The apparatus of claim 2, wherein the apparatus is to configure a third channel of the plurality of channels carry a clock signal from the apparatus to the receiving device for the bidirectional data transmission, and wherein the third channel is a second data channel of the plurality of data channels.

10. The apparatus of claim 2, wherein the bidirectional data transmission mode is directed by a controller.

11. The apparatus of claim 10, wherein the controller is contained in the apparatus.

12. The apparatus of claim 10, wherein the controller is contained in an external unit coupled with the media interface.

13. The apparatus of claim 10, wherein the controller is coupled with a network PHY (physical layer).

14. The system of claim 3, wherein configuration of plurality of channels includes configuring a second data channel of the one or more data channels for transmission of a clock signal from the first device to the second device in the bidirectional data transmission mode.

15. The system of claim 3, further comprising a third device, the third device having a media interface connection to connect with the first device.

16. The system of claim 15, wherein if the third device is capable of transferring bidirectional data then the first device acts as bridge to provide transfer bidirectional data between the second device and the third device.

17. The system of claim 15, wherein if the third device is not capable of transferring bidirectional data then the first device acts as a length extender between the second device and the third device.

18. The system of claim 3, further comprising a controller to control transmission of data via the bidirectional data protocol; and a physical layer (PHY) for the bidirectional data protocol.

19. The method of claim 1, wherein connecting the first device to the second device via the media interface includes connecting an external dongle element between the first device and the second device, the external dongle element including a controller to support the transmission of bidirectional network data.

* * * * *